United States Patent
Jeong et al.

(10) Patent No.: US 9,580,597 B2
(45) Date of Patent: Feb. 28, 2017

(54) POLYCARBONATE COMPOSITION AND ARTICLE COMPRISING THE SAME

(71) Applicant: LG CHEM, LTD., Seoul (KR)

(72) Inventors: Yoon Seon Jeong, Daejeon (KR); Moo Seok Lee, Daejeon (KR); Ryul Lee, Daejeon (KR); Sung Tae Ahn, Daejeon (KR); Ik Hwan Cho, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 15/026,905

(22) PCT Filed: Dec. 4, 2015

(86) PCT No.: PCT/KR2015/013247
§ 371 (c)(1),
(2) Date: Apr. 1, 2016

(87) PCT Pub. No.: WO2016/089172
PCT Pub. Date: Jun. 9, 2016

(65) Prior Publication Data
US 2016/0319127 A1    Nov. 3, 2016

(30) Foreign Application Priority Data

Dec. 4, 2014  (KR) .................. 10-2014-0173005
Dec. 3, 2015  (KR) .................. 10-2015-0171781

(51) Int. Cl.
| | | |
|---|---|---|
| C08G 64/16 | (2006.01) | |
| C08G 64/30 | (2006.01) | |
| C08G 64/38 | (2006.01) | |
| C08L 69/00 | (2006.01) | |
| C08G 64/18 | (2006.01) | |

(52) U.S. Cl.
CPC ............ *C08L 69/00* (2013.01); *C08G 64/186* (2013.01)

(58) Field of Classification Search
None
See application file for complete search history.

(56) References Cited

U.S. PATENT DOCUMENTS

| | | | |
|---|---|---|---|
| 5,243,009 A * | 9/1993 | Rich ................ | C08G 77/448 528/26 |
| 5,324,454 A | 6/1994 | Takata et al. | |
| 5,380,795 A | 1/1995 | Gosens et al. | |
| 5,455,310 A | 10/1995 | Hoover et al. | |
| 5,502,134 A | 3/1996 | Okamoto et al. | |
| 5,608,026 A | 3/1997 | Hoover et al. | |
| 5,783,651 A | 7/1998 | König et al. | |
| 5,932,677 A | 8/1999 | Hoover et al. | |
| 6,001,929 A | 12/1999 | Nodera et al. | |
| 6,252,013 B1 | 6/2001 | Banach et al. | |
| 6,281,286 B1 | 8/2001 | Chorvath et al. | |
| 6,780,956 B2 | 8/2004 | Davis | |
| 7,135,538 B2 | 11/2006 | Glasgow et al. | |
| 7,332,559 B2 | 2/2008 | Hong et al. | |
| 7,432,327 B2 | 10/2008 | Glasgow | |
| 7,498,401 B2 | 3/2009 | Agarwal | |
| 7,524,919 B2 | 4/2009 | Hoover et al. | |
| 7,691,304 B2 | 4/2010 | Agarwal et al. | |
| 7,709,581 B2 * | 5/2010 | Glasgow ............ | C08L 83/10 525/464 |
| 7,718,733 B2 | 5/2010 | Juikar et al. | |
| 8,030,379 B2 | 10/2011 | Nodera et al. | |
| 8,084,134 B2 | 12/2011 | Malinoski et al. | |
| 8,124,683 B2 | 2/2012 | Jung et al. | |
| 8,389,648 B2 | 3/2013 | Adoni et al. | |
| 8,466,249 B2 | 6/2013 | Gallucci et al. | |
| 8,552,096 B2 | 10/2013 | Li et al. | |
| 8,912,290 B2 | 12/2014 | Huggins et al. | |
| 8,933,186 B2 | 1/2015 | Bahn et al. | |
| 8,962,780 B2 | 2/2015 | Higaki et al. | |
| 8,981,017 B2 | 3/2015 | Ishikawa | |
| 9,062,164 B2 | 6/2015 | Kim et al. | |
| 9,102,832 B2 | 8/2015 | Sybert et al. | |
| 9,255,179 B2 | 2/2016 | Park et al. | |
| 2004/0200303 A1 | 10/2004 | Inoue et al. | |
| 2006/0148986 A1 | 7/2006 | Glasgow et al. | |
| 2007/0093629 A1 | 4/2007 | Silva et al. | |
| 2007/0135569 A1 | 6/2007 | DeRudder | |
| 2007/0241312 A1 | 10/2007 | Hikosaka | |
| 2007/0258412 A1 | 11/2007 | Schilling et al. | |
| 2008/0015289 A1 | 1/2008 | Siripurapu | |
| 2008/0081895 A1 | 4/2008 | Lens et al. | |
| 2008/0230751 A1 | 9/2008 | Li et al. | |
| 2009/0087761 A1 | 4/2009 | Fukushima et al. | |
| 2009/0326183 A1 | 12/2009 | Schultz et al. | |
| 2010/0233603 A1 | 9/2010 | Hikosaka | |
| 2012/0123034 A1 | 5/2012 | Morizur et al. | |
| 2012/0252985 A1 | 10/2012 | Rosenquist et al. | |
| 2012/0271009 A1 | 10/2012 | Higaki et al. | |
| 2012/0283393 A1 | 11/2012 | Ishikawa | |

(Continued)

FOREIGN PATENT DOCUMENTS

| | | |
|---|---|---|
| CN | 104066773 A | 9/2014 |
| EP | 0524731 B1 | 3/2002 |

(Continued)

OTHER PUBLICATIONS

Hwang, et al.: "Production of impact strength and fluidity-improved polycarbonate and composition comprising same" Chemical Abstract for US2016/0251481A1, Mar. 24, 2016.
chemical Abstract registry No. 163617-00-3, Jun. 8, 1995.

Primary Examiner — Randy Gulakowski
Assistant Examiner — Christopher M Rodd
(74) Attorney, Agent, or Firm — Dentons US LLP

(57) ABSTRACT

The present invention relates to a polycarbonate composition including a polycarbonate and an impact reinforcing agent, and an inorganic filler to improve a mechanical property thereof, and a copolycarbonate to solve a problem of appearance defect caused by including the inorganic filler.

12 Claims, No Drawings

(56) References Cited

U.S. PATENT DOCUMENTS

| | | |
|---|---|---|
| 2013/0082222 A1 | 4/2013 | Aoki |
| 2013/0186799 A1 | 7/2013 | Stam et al. |
| 2013/0190425 A1 | 7/2013 | Zhu et al. |
| 2013/0267665 A1 | 10/2013 | Huggins et al. |
| 2013/0274392 A1 | 10/2013 | Morizur et al. |
| 2013/0289224 A1 | 10/2013 | Bae et al. |
| 2013/0309474 A1 | 11/2013 | Peek et al. |
| 2013/0317146 A1 | 11/2013 | Li et al. |
| 2013/0317150 A1 | 11/2013 | Wan et al. |
| 2014/0106208 A1 | 4/2014 | Ishikawa et al. |
| 2014/0148559 A1 | 5/2014 | Kim et al. |
| 2014/0179843 A1 | 6/2014 | Van Der Mee et al. |
| 2014/0206802 A1 | 7/2014 | Bahn et al. |
| 2015/0057423 A1 | 2/2015 | Kim et al. |
| 2015/0175802 A1 | 6/2015 | Sybert et al. |
| 2015/0197633 A1 | 7/2015 | Van Der Mee et al. |
| 2015/0210854 A1 | 7/2015 | Aoki |
| 2015/0218371 A1 | 8/2015 | Lee et al. |
| 2015/0307706 A1 | 10/2015 | Rosenquist et al. |
| 2015/0315380 A1 | 11/2015 | Bahn et al. |
| 2015/0344623 A1 | 12/2015 | Park et al. |
| 2015/0368484 A1 | 12/2015 | Shishaku et al. |
| 2016/0002410 A1 | 1/2016 | Iyer et al. |
| 2016/0017102 A1 | 1/2016 | Yamada |
| 2016/0122477 A1 | 5/2016 | Rhee et al. |
| 2016/0251481 A1 | 9/2016 | Hwang et al. |
| 2016/0297926 A1 | 10/2016 | Hwang et al. |
| 2016/0326312 A1 | 11/2016 | Park et al. |
| 2016/0326313 A1 | 11/2016 | Son et al. |
| 2016/0326314 A1 | 11/2016 | Son et al. |
| 2016/0326321 A1 | 11/2016 | Park et al. |

FOREIGN PATENT DOCUMENTS

| | | |
|---|---|---|
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 6/1996 |
| JP | 10-204179 A | 8/1998 |
| JP | 2000-280414 A | 10/2000 |
| JP | 2000-302962 A | 10/2000 |
| JP | 3393616 B2 | 4/2003 |
| JP | 3457805 B2 | 10/2003 |
| JP | 2008-248262 A | 10/2008 |
| JP | 2011-236287 A | 11/2011 |
| JP | 2012-116915 A | 6/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015-163722 A | 9/2015 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 2015-0134457 A | 12/2015 |
| TW | 201241043 a | 10/2012 |
| WO | 2012/060516 A1 | 5/2012 |
| WO | 2013/051557 A1 | 4/2013 |
| WO | 2013-115538 A1 | 8/2013 |
| WO | 2013/115604 A1 | 8/2013 |
| WO | 2013/175445 A2 | 11/2013 |
| WO | 2014/042252 A1 | 3/2014 |
| WO | 2014/058033 A1 | 4/2014 |
| WO | 2014/119827 A1 | 8/2014 |
| WO | 2014/144673 A1 | 9/2014 |
| WO | 2015/011669 A2 | 1/2015 |
| WO | 2015/015445 A2 | 2/2015 |
| WO | 2015/041441 A1 | 3/2015 |
| WO | 2015/087595 a1 | 6/2015 |

* cited by examiner

POLYCARBONATE COMPOSITION AND ARTICLE COMPRISING THE SAME

CROSS-REFERENCE TO RELATED APPLICATION(S)

This application is a National Stage Application of International Application No. PCT/KR2015/013247, filed on Dec. 4, 2015, which claims the benefit of Korean Patent Application No. 10-2014-0173005 filed on Dec. 4, 2014 and Korean Patent Application No. 10-2015-0171781 filed on Dec. 3, 2015, all of which are hereby incorporated by reference in their entirety for all purposes as if fully set forth herein.

TECHNICAL FIELD

The present invention relates to a polycarbonate composition having an excellent mechanical property and appearance and an article comprising the same.

BACKGROUND OF ART

A polycarbonate resin is prepared by condensation-polymerization of an aromatic diol such as bisphenol A with a carbonate precursor such as phosgene and has excellent mechanical and heat properties. Particularly, the polycarbonate resin has high impact resistance at room temperature, and has excellent dimensional stability. Until now, studies on a technology of implementing excellent physical property by adding various kinds of fillers into the polycarbonate resin have been conducted.

Recently, study on a polycarbonate resin composition having increased processability by mixing an acrylonitrile-butadiene-styrene (ABS)-based copolymer has been actively conducted in addition to the polycarbonate resin, wherein the polycarbonate resin is generally referred to as a PC/ABS resin or a PC/ABS alloy. In case of the PC/ABS resin, in order to improve a mechanical property, an inorganic filler (for example, talc) is added to the PC/ABS resin, so that the mechanical property may be improved. However, there is a drawback such as flow mark at the time of injection molding. When an appearance defect such as flow mark occurs, additional processes such as a coating process, etc., are required as post treatment processes, so that production cost is increased.

Meanwhile, in order that the polycarbonate resin is applied to more various fields, many studies have been conducted to obtain a desired physical property by copolymerizing two or more aromatic dial compounds having different structures and introducing units having different structures in a main chain of the polycarbonate.

Given the above circumstances, the present inventors have been made in an effort to solve a problem of appearance defect caused by including the inorganic filler in the polycarbonate resin, and as a result, found that at the time of including a copolycarbonate comprising two or more different repeating units together in addition to the inorganic filler as described below, the problem of appearance defect is capable of being solved while maintaining an effect of improving a mechanical property according to the addition of the inorganic filler, and completed the present invention.

DETAILED DESCRIPTION OF THE INVENTION

Technical Problem

It is an object of the present invention to provide a polycarbonate composition having advantages of an excellent mechanical property and appearance.

It is a further object of the present invention to provide an article comprising the polycarbonate composition.

Technical Solution

In order to achieve these objects, the present invention provides a polycarbonate composition comprising:

a polycarbonate, an impact reinforcing agent, a copolycarbonate comprising an aromatic polycarbonate-based first repeating unit; and one or more aromatic polycarbonate-based second repeating units having siloxane bonds, and an inorganic filler, wherein the first repeating unit is represented by Chemical Formula 1 below, and the second repeating unit comprises a repeating unit represented by Chemical Formula 2 below and a repeating unit represented by Chemical Formula 3 below:

[Chemical Formula 1]

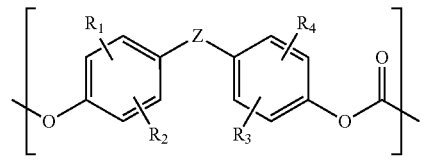

in the Chemical Formula 1, $R_1$, $R_2$, $R_3$ and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Chemical Formula 2]

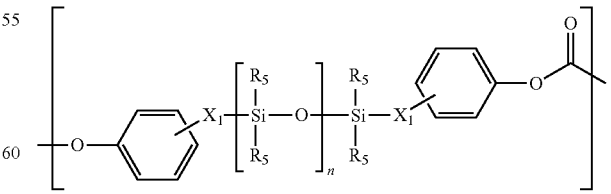

in the Chemical Formula 2, $X_1$ is each independently $C_{1-10}$ alkylene, $R_5$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 10 to 200,

[Chemical Formula 3]

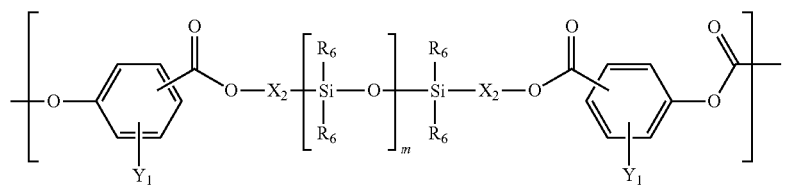

in the Chemical Formula 3, $X_2$ is each independently $C_{1-10}$ alkylene, $Y_1$ is independently hydrogen, $C_{1-6}$ alkyl, halogen, hydroxy, $C_{1-6}$ alkoxy, or $C_{6-20}$ aryl, $R_6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 10 to 200.

Preferably, the polycarbonate composition comprises 1 to 13 parts by weight of the polycarbonate, 1 part by weight of the impact reinforcing agent, 1 to 6 parts by weight of the copolycarbonate, and 0.5 to 4 parts by weight of the inorganic filler.

The polycarbonate composition according to the present invention comprises the polycarbonate and the impact reinforcing agent, and the inorganic filler for improving a mechanical property thereof. Further, in order to solve a problem of appearance defect caused by comprising the inorganic filler, the polycarbonate composition comprises the above described copolycarbonate.

The copolycarbonate according to the present invention is obtained by introducing a specific siloxane compound into a polycarbonate main chain, which may solve the problem of appearance defect while maintaining the effect of improving a mechanical property according to the addition of the inorganic filler, so that the mechanical property and the appearance may be simultaneously improved.

Hereinafter, the present invention is described in more detail.

Polycarbonate and Impact Reinforcing Agent

The polycarbonate used in the present invention is distinguished from the copolycarbonate to be described below in that a polysiloxane structure is not introduced into the main chain of polycarbonate.

In addition to the polycarbonate, the polycarbonate composition according to the present invention further comprises the impact reinforcing agent to improve impact resistance, heat resistance, formability, etc.

As the impact reinforcing agent usable in the present invention, a methylmethacrylate-butadiene-styrene-based copolymer, a styrene-acrylonitrile-based copolymer, an acrylonitrile-butadiene-styrene-based copolymer, or mixtures thereof, may be used. The above sequentially described impact reinforcing agents are known as an MBS resin, a SAN resin, and an ABS resin, respectively. More preferably, a mixture of the MBS resin and the SAN resin may be used as the impact reinforcing agent, and a weight ratio thereof may be 1:10 to 10:1, more preferably, 1:5 to 5:1, and the most preferably, 1:3 to 3:1.

The polycarbonate may preferably have an amount of 5 to 13 parts by weight, and more preferably, 8 to 11 parts by weight, based on 1 part by weight of the impact reinforcing agent. Within the range as described above, an effect of improving impact resistance, heat resistance, formability, etc., is excellent.

The polycarbonate is prepared by reacting an aromatic diol compound and a carbonate precursor, and preferably comprises a repeating unit represented by Chemical Formula 4 below:

[Chemical Formula 4]

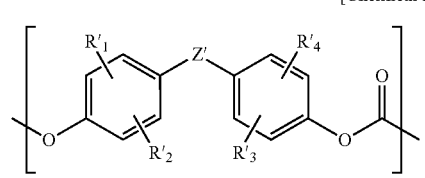

in the Chemical Formula 4, $R'_1$, $R'_2$, $R'_3$ and $R'_4$ are each independently hydrogen, $C_{1-10}$ alkyl, $C_{1-10}$ alkoxy, or halogen, and $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

In addition, the polycarbonate preferably has a weight average molecular weight (g/mol) of 1,000 to 100,000, and more preferably, 15,000 to 35,000. More preferably, the weight average molecular weight is not less than 20,000, not less than 21,000, not less than 22,000, not less than 23,000, not less than 24,000, not less than 25,000, not less than 26,000, not less than 27,000, or not less than 28,000. Further, the weight average molecular weight is not more than 34,000, not more than 33,000, or not more than 32,000.

Preferably, $R'_1$, $R'_2$, $R'_3$ and $R'_4$ are each independently hydrogen, methyl, chloro, or bromo.

In addition, preferably, $Z'$ is a linear or branched $C_{1-10}$ alkylene unsubstituted or substituted with phenyl, and more preferably, methylene, ethane-1,1-diyl, propane-2,2-diyl, butane-2,2-diyl, 1-phenylethane-1,1-diyl, or diphenylmethylene. In addition, preferably, $Z'$ is cyclohexane-1,1-diyl, O, S, SO, $SO_2$, or CO.

Preferably, the repeating unit represented by Chemical Formula 4 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3- chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and the carbonate precursor are reacted to form the repeating unit represented by Chemical Formula 4.

For example, when bisphenol A, which is the aromatic diol compound, and triphosgene, which is the carbonate precursor, are polymerized, the repeating unit represented by Chemical Formula 4 is represented by the following Chemical Formula 4-1:

[Chemical Formula 4-1]

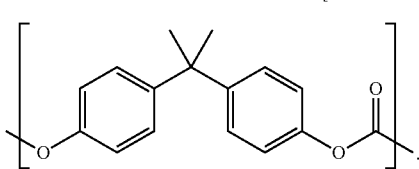

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl) carbonate, phosgene, triphosgene, diphosgene, bromo phosgene, and bishaloformate may be used. Preferably, triphosgene or phosgene may be used.

Copolycarbonate

The copolycarbonate used in the present invention means a polymer in which a polysiloxane structure is introduced into a main chain of polycarbonate. The copolycarbonate has an effect of suppressing an appearance defect caused by adding an inorganic filler.

The copolycarbonate may preferably have an amount of 1 to 6 parts by weight, and more preferably, 2 to 5 parts by weight, based on 1 part by weight of the impact reinforcing agent. Within the range as described above, the effect of suppressing the appearance defect is excellent.

The main chain of the polycarbonate is formed by reacting the aromatic diol compound and the carbonate precursor, and specifically means the repeating unit represented by Chemical Formula 1.

In Chemical Formula 1, preferably, $R_1$, $R_2$, $R_3$ and $R_4$ are each independently hydrogen, methyl, chloro, or bromo.

In addition, preferably, Z is a linear or branched $C_{1-10}$ alkylene unsubstituted or substituted with phenyl, and more preferably, methylene, ethane-1,1-diyl, propane-2,2-diyl, butane-2,2-diyl, 1-phenylethane-1,1-diyl, or diphenylmethylene. In addition, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and the carbonate precursor are reacted to form the repeating unit represented by Chemical Formula 1.

For example, when bisphenol A, which is the aromatic diol compound, and triphosgene, which is the carbonate precursor, are polymerized, the repeating unit represented by Chemical Formula 1 is represented by the following Chemical Formula 1-1:

[Chemical Formula 1-1]

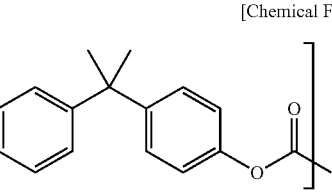

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromo phosgene, and bishaloformate may be used. Preferably, triphosgene or phosgene may be used.

The polysiloxane structure means the repeating unit represented by Chemical Formula 2 and the repeating unit represented by Chemical Formula 3.

In the Chemical Formula 2, preferably, $X_1$ is each independently $C_{2-10}$ alkylene, and more preferably, $C_{2-4}$ alkylene, and the most preferably, propane-1,3-diyl.

In addition, preferably, $Y_1$ is hydrogen, or $C_{1-6}$ alkoxy, more preferably, hydrogen or $C_{1-4}$ alkoxy, and the most preferably, hydrogen or methoxy.

In addition, preferably, $R_5$ is each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl or naphthyl. More preferably, $R_5$ is each independently $C_{1-10}$ alkyl, more preferably, $C_{1-6}$ alkyl, and more preferably, $C_{1-3}$ alkyl, and the most preferably, methyl.

In addition, preferably, n is an integer of not less than 10, not less than 15, not less than 20, not less than 25, not less than 30, not less than 31, or not less than 32; and not more than 75, not more than 70, not more than 65, not more than 60, not more than 55, not more than 50, not more than 45, not more than 40, not more than 39, not more than 38, or not more than 37.

In Chemical Formula 3, preferably, $X_2$ is each independently $C_{2-10}$ alkylene, and more preferably, $C_{2-6}$ alkylene, and the most preferably, isobutylene.

In addition, preferably, $Y_2$ is hydrogen.

In addition, preferably, $R_6$ is each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl or naphthyl. More preferably, $R_6$ is each independently $C_{1-10}$ alkyl, more preferably, $C_{1-6}$ alkyl, and more preferably, $C_{1-3}$ alkyl, and the most preferably, methyl.

In addition, preferably, m is an integer of not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 2 and the repeating unit represented by Chemical Formula 3 are derived from a siloxane compound represented by Chemical Formula 2-1 below and a siloxane compound represented by Chemical Formula 3-1 below, respectively:

[Chemical Formula 2-1]

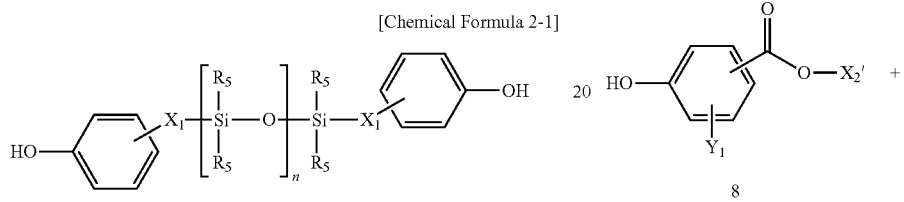

in the Chemical Formula 2-1, $X_1$, $Y_1$, $R_5$ and n are the same as previously defined,

[Chemical Formula 3-1]

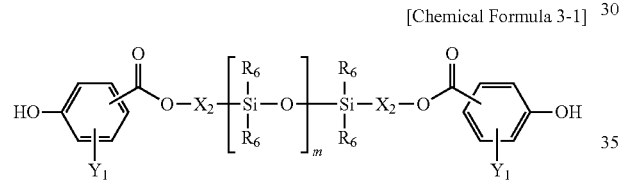

in the Chemical Formula 3-1, $X_2$, $Y_2$, $R_6$ and m are the same as previously defined.

As used herein, 'derived from a siloxane compound' means that a hydroxy group of each of the siloxane compounds and a carbonate precursor are reacted to form the repeating unit represented by Chemical Formula 2 and the repeating unit represented by the Chemical Formula 3, respectively. Further, descriptions of the carbonate precursors that may be used for the formation of the repeating units represented by Chemical Formulas 2 and 3 are the same as those described for the carbonate precursor that may be used for the formation of the repeating unit represented by Chemical Formula 1 described above.

Methods for preparing the siloxane compound represented by Chemical Formula 2-1 and the siloxane compound represented by Chemical Formula 3-1 are represented by Reaction Schemes 1 and 2 below, respectively:

[Reaction Scheme 1]

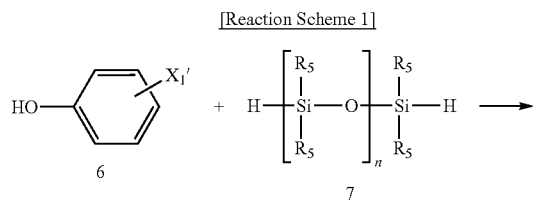

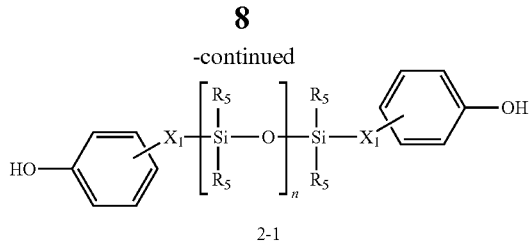

2-1 in the Reaction Scheme 1,
$X_1'$ is $C_{2-10}$ alkenyl, and
$X_1$, $Y_1$, $R_5$ and n are the same as previously defined,

[Reaction Formula 2]

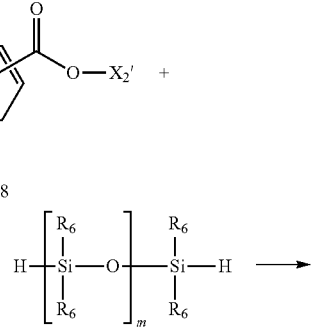

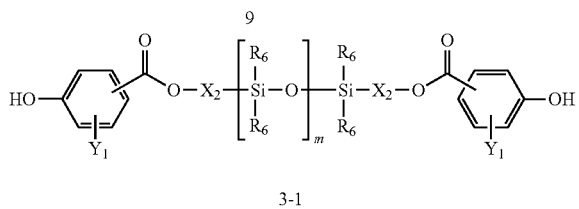

3-1 in the Reaction Scheme 2,
$X_2'$ is $C_{2-10}$ alkenyl, and
$X_2$, $Y_2$, $R_6$ and m are the same as previously defined.

In the Reaction Scheme 1 and Reaction Scheme 2, the reaction may be preferably conducted in the presence of a metal catalyst. As the metal catalyst, a platinum (Pt) catalyst may be preferably used. The Pt catalyst may include at least one selected from the group consisting of Ashby catalyst, Karstedt catalyst, Lamoreaux catalyst, Speier catalyst, $PtCl_2$ (COD), $PtCl_2$(benzonitrile)$_2$, and $H_2PtBr_6$. The metal catalyst may have an amount of more than 0.001 parts by weight, not less than 0.005 parts by weight, or not less than 0.01 parts by weight; and not more than 1 part by weight, not more than 0.1 parts by weight, or not more than 0.05 parts by weight, based on 100 parts by weight of the compound represented by Chemical Formula 7 or 9.

Further, a reaction temperature is preferably 80 to 100° C. Further, a reaction time is preferably 1 to 5 hours.

In addition, the compound represented by Chemical Formula 7 or 9 may be prepared by reacting an organodisiloxane and an organocyclosiloxane in the presence of an acid catalyst, and n and m may be adjusted by adjusting amounts of the reaction materials. A reaction temperature is preferably 50 to 70° C. A reaction time is preferably 1 to 6 hours.

As the organodisiloxane, at least one selected from the group consisting of tetramethyldisiloxane, tetraphenyldisiloxane, hexamethyldisiloxane, and hexaphenyldisiloxane may be used. In addition, as the organocyclosiloxane, for example, organocyclotetrasiloxane may be used. Examples of the organocyclotetrasiloxane may include octamethylcyclotetrasiloxane, octaphenylcyclotetrasiloxane, etc.

The organodisiloxane may have an amount of not less than 0.1 parts by weight, or not less than 2 parts by weight; and not more than 10 parts by weight, or not more than 8 parts by weight, based on 100 parts by weight of the organocyclosiloxane.

As the acid catalyst, at least one selected from the group consisting of $H_2SO_4$, $HClO_4$, $AlCl_3$, $SbCl_5$, $SnCl_4$ and acid clay may be used. Further, the acid catalyst may have an amount of more than 0.1 parts by weight, not less than 0.5 parts by weight, or not less than 1 part by weight; and not more than 10 parts by weight, not more than 5 parts by weight, not more than 3 parts by weight, based on 100 parts by weight of the organocyclosiloxane.

Particularly, a physical property of the copolycarbonate (A) may be adjusted by adjusting amounts of the repeating unit represented by Chemical Formula 2 and the repeating unit represented by Chemical Formula 3. A weight ratio between the repeating units may be 1:99 to 99:1. Preferably, the weight ratio is 3:97 to 97:3, 5:95 to 95:5, 10:90 to 90:10, or 15:85 to 85:15, and more preferably, 20:80 to 80:20. The weight ratio of the repeating units corresponds to a weight ratio of siloxane compounds, for example, the siloxane compound represented by Chemical Formula 2-1 and the siloxane compound represented by Chemical Formula 3-1.

Preferably, the repeating unit represented by Chemical Formula 2 is represented by Chemical Formula 2-2 below:

[Chemical Formula 2-2]

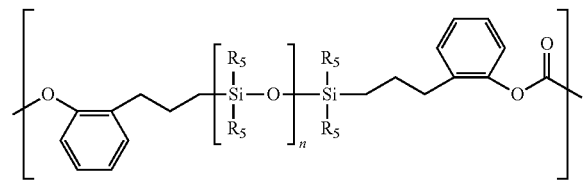

in the Chemical Formula 2-2, $R_5$ and n are the same as previously defined. Preferably, $R_5$ is methyl.

In addition, preferably, the repeating unit represented by Chemical Formula 3 is represented by Chemical Formula 3-2 below:

[Chemical Formula 3-2]

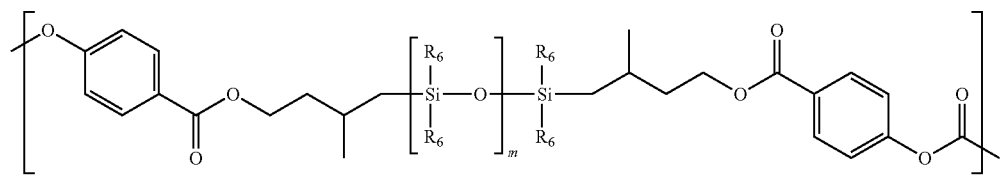

in the Chemical Formula 3-2, $R_6$ and m are the same as previously defined. Preferably, $R_6$ is methyl.

In addition, in the copolycarbonate (A), there is provided a copolycarbonate comprising all of repeating units represented by Chemical Formulas 1-1, 2-2, and 3-2.

Further, a weight ratio of a weight of the repeating unit represented by Chemical Formula 1 and a sum of weights of the repeating unit represented by Chemical Formula 2 and the repeating unit represented by Chemical Formula 3, i.e., a weight ratio (Chemical Formula 1:(Chemical Formula 2+Chemical Formula 3)) is preferably 1:0.04 to 0.07.

In addition, the present invention provides a method for preparing the copolycarbonate (A) including polymerizing an aromatic diol compound, a carbonate precursor, and at least one siloxane compound, as a method for preparing the above-described copolycarbonate (A).

The aromatic diol compound, the carbonate precursor, and at least one siloxane compound are the same as previously described.

At the time of the polymerization, at least one siloxane compound may be used in an amount of not less than 1 wt %, not less than 1.1 wt %, not less than 1.2 wt %, not less than 1.3 wt %, not less than 1.4 wt %, or not less than 1.5 wt %; and not more than 3 wt %, not more than 2.9 wt %, not more than 2.8 wt %, not more than 2.7 wt %, not more than 2.6 wt %, not more than 2.5 wt %, not more than 2.4 wt %, not more than 2.3 wt %, not more than 2.2 wt %, not more than 2.1 wt %, or not more than 2 wt %, based on 100 wt % in total of the aromatic diol compound, the carbonate precursor, and at least one siloxane compound. In addition, the aromatic diol compound may be used in an amount of not less than 40 wt %, not less than 50 wt %, or not less than 55 wt %; and not more than 80 wt %, not more than 70 wt %, or not more than 65 wt %, based on 100 wt % in total of the aromatic diol compound, the carbonate precursor, and at least one siloxane compound. In addition, the carbonate precursor may be used in an amount of not less than 10 wt %, not less than 20 wt %, or not less than 30 wt %; and not more than 60 wt %, not more than 50 wt %, or not more than 40 wt %, based on 100 wt % in total of the aromatic diol compound, the carbonate precursor, and at least one siloxane compound.

In addition, as the polymerization method, an interfacial polymerization method may be used as one example. In this case, the polymerization reaction may be carried out at a low temperature and an atmospheric pressure, and may easily control a molecular weight. The interfacial polymerization may be preferably conducted in the presence of an acid binder and an organic solvent. Furthermore, the interfacial polymerization may include, for example, steps of conducting pre-polymerization, then adding a coupling agent and conducting polymerization again. In this case, a copolycarbonate (A) having a high molecular weight may be obtained.

The materials used in the interfacial polymerization are not particularly limited as long as they may be used in polymerization of polycarbonates. The used amount thereof may be adjusted as required.

The acid binder may include, for example, alkali metal hydroxides such as sodium hydroxide, potassium hydroxide, etc., or amine compounds such as pyridine, etc.

The organic solvent is not particularly limited as long as it is a solvent that is usually used in the polymerization of polycarbonates. As one example, halogenated hydrocarbons such as methylene chloride, chlorobenzene, etc., may be used.

Further, during the interfacial polymerization, a reaction accelerator, for example, a tertiary amine compound such as triethylamine, tetra-n-butylammonium bromide, tetra-n-butylphosphonium bromide, or the like, a quaternary ammonium compound, a quaternary phosphonium compound, or the like, may be further used for accelerating the reaction.

In the interfacial polymerization, a reaction temperature may be preferably 0 to 40° C., and a reaction time may be preferably 10 minutes to 5 hours. Further, during the interfacial polymerization reaction, pH may be preferably maintained at 9 or more, or 11 or more.

In addition, the interfacial polymerization reaction may be carried out by further including a molecular weight modifier. The molecular weight modifier may be added before the initiation of polymerization, during the initiation of polymerization, or after the initiation of polymerization.

As the molecular weight modifier, mono-alkyl phenol may be used. As one example, the mono-alkyl phenol is at least one selected from the group consisting of p-tert-butyl phenol, p-cumyl phenol, decyl phenol, dodecyl phenol, tetradecyl phenol, hexadecyl phenol, octadecyl phenol, eicosyl phenol, docosyl phenol and triacontyl phenol. Preferably, the mono-alkyl phenol may be p-tert-butylphenol, and in this case, the effect of adjusting the molecular weight is great.

The molecular weight modifier may have an amount of not less than 0.01 parts by weight, not less than 0.1 parts by weight, or not less than 1 part by weight; and not more than 10 parts by weight, not more than 6 parts by weight, or not more than 5 parts by weight, based on 100 parts by weight of the aromatic diol compound. Within the range as described above, a desired molecular weight may be obtained.

The copolycarbonate preferably has a weight average molecular weight (g/mol) of 1,000 to 100,000, and more preferably, 15,000 to 35,000. More preferably, the weight average molecular weight is not less than 20,000, not less than 21,000, not less than 22,000, not less re than 23,000, not less than 24,000, not less than 25,000, not less than 26,000, not less than 27,000, or not less than 28,000. Further, the weight average molecular weight is not more than 34,000, not more than 33,000, or not more than 32,000.

Inorganic Filler

The inorganic filler used in the present invention is used to improve the physical property of the polycarbonate.

In general, when the inorganic filler is included, the physical property is improved, but a problem of appearance defect such as a flow mark may be caused at the time of carrying out processes such as injection molding. However, the present invention may suppress the cause of the appearance defect by comprising the copolycarbonate as described above.

The inorganic filler may preferably be included in an amount of 0.5 to 4 parts by weight, more preferably, 0.5 to 3 parts by weight, and the most preferably, 0.5 to 2 parts by weight, based on 1 part by weight of the impact reinforcing agent. Within the range as described above, the effect of improving the physical property is excellent.

As the inorganic filler, talc, wollastonite, mica, or mixtures thereof may be used.

Polycarbonate Composition

The polycarbonate resin composition of the present invention comprises the polycarbonate, the impact reinforcing agent, the copolycarbonate, and the inorganic filler as described above.

In addition, the polycarbonate resin composition may further comprise at least one additive selected from the group consisting of flame retardants, antioxidants, heat stabilizers, light stabilizers, plasticizers, antistatic agents, nucleating agents, lubricants, impact reinforcing agents, fluorescent brightening agents, ultraviolet absorbers, pigments, and dyes, as needed.

Particularly, the flame retardant may be a phosphorus-based flame retardant. The phosphorus-based flame retardant is not particularly limited as long as it is conventionally used in the art, and as an example, a bisphenol-A bis (diphenyl phosphate) may be used. The flame retardant may be included in an amount of 0.5 to 4 parts by weight, based on 1 part by weight of the impact reinforcing agent. Within the range as described above, an effect of improving flame retardancy is excellent.

In addition, the present invention provides an article comprising the polycarbonate composition. Preferably, the article is an injection-molded article. As described above, the polycarbonate composition according to the present invention may comprise the polycarbonate and the impact reinforcing agent, and may comprise the inorganic filler to improve the mechanical property thereof, and may comprise the copolycarbonate to solve the problem of appearance defect caused by including the inorganic filler.

A method for manufacturing the molded article may comprise steps of mixing the polycarbonate composition according to the present invention and additives as needed, using a mixer, extrusion-molding the mixture with an extruder to produce a pellet, drying the pellet and then injecting the dried pellet with an injection molding machine.

Advantageous Effects

As described above, the polycarbonate composition according to the present invention may comprise the polycarbonate and the impact reinforcing agent, and may comprise the inorganic filler to improve mechanical properties thereof, and may comprise the copolycarbonate to solve the problem of appearance defect caused by including the inorganic filler.

DETAILED DESCRIPTION OF THE EMBODIMENTS

Below, preferred embodiments will be provided in order to assist in the understanding of the present disclosure. However, these examples are provided only for illustration of the present invention, and should not be construed as limiting the present invention by the examples.

Preparation Example 1

AP-PDMS(n=34)

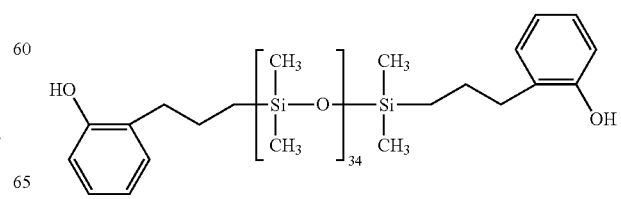

After 47.60 g (160 mmol) of octamethylcyclotetrasiloxane and 2.40 g (17.8 mmol) of tetramethyldisiloxane were mixed, the mixture was placed in a 3 L flask with 1 part by weight of acid clay (DC-A3) based on 100 parts by weight of octamethylcyclotetrasiloxane, and reacted at 60° C. for 4 hours. After the reaction was terminated, the reaction product was diluted with ethylacetate and quickly filtered using a celite. The repeating unit (n) of the terminal-unmodified polyorganosiloxane obtained as described above was 34 when confirmed through $^1$H NMR.

4.81 g (35.9 mmol) of 2-allylphenol and 0.01 g (50 ppm) of Karstedt's platinum catalyst were added to the obtained terminal-unmodified polyorganosiloxane and reacted at 90° C. for 3 hours. After the reaction was terminated, the unreacted polyorganosiloxane was removed by evaporation under condition of 120° C. and 1 torr. The terminal-modified polyorganosiloxane obtained as described above was designated as AP-PDMS(n=34). AP-PDMS was pale yellow oil, the repeating unit (n) was 34 when confirmed through $^1$H NMR using Varian 500 MHz, and further purification was not required.

Preparation Example 2

MBHB-PDMS(m=58)

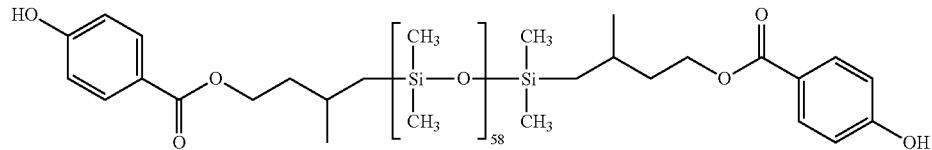

After 47.60 g (160 mmol) of octamethylcyclotetrasiloxane and 1.5 g (11 mmol) of tetramethyldisiloxane were mixed, the mixture was placed in a 3 L flask with 1 part by weight of acid clay (DC-A3) based on 100 parts by weight of octamethylcyclotetrasiloxane, and reacted at 60° C. for 4 hours. After the reaction was terminated, the reaction product was diluted with ethylacetate and quickly filtered using a celite. The repeating unit (m) of the terminal-unmodified polyorganosiloxane obtained as described above was 58 when confirmed through $^1$H NMR.

6.13 g (29.7 mmol) of 3-methylbut-3-enyl 4-hydroxybenzoate and 0.01 g (50 ppm) of Karstedt's platinum catalyst were added to the obtained terminal-unmodified polyorganosiloxane and reacted at 90° C. for 3 hours. After the reaction was terminated, the unreacted polyorganosiloxane was removed by evaporation under condition of 120° C. and 1 torr. The terminal-modified polyorganosiloxane obtained as described above was designated as MBHB-PDMS (m=58). MBHB-PDMS was pale yellow oil, the repeating unit (m) was 58 when confirmed through $^1$H NMR using Varian 500 MHz, and further purification was not required.

Preparation Example 3

Si—PC 1784 g of water, 385 g of NaOH and 232 g of bisphenol A (BPA) were added to a polymerization reactor, and dissolved with mixing under $N_2$ atmosphere. 4.3 g of para-tert butylphenol (PTBP) and a mixed solution of 5.91 g of AP-PDMS(n=34) prepared by Preparation Example 1 and 0.66 g of MBHB-PDMS(m=58) prepared by Preparation Example 2 (a weight ratio of 90:10) were dissolved in methylene chloride (MC) and then added to the mixture. Subsequently, 128 g of TPG (triphosgene) was dissolved in MC and the dissolved TPG solution was added thereto and reacted for 1 hour while maintaining pH of the TPG solution at 11 or more. After 10 minutes, 46 g of TEA (triethylamine) was added thereto to carry out a coupling reaction. After a total reaction time of 1 hour and 20 minutes, pH was lowered to 4 to remove TEA, and then pH of the produced polymer was adjusted to neutral pH of 6 to 7 by washing three times with distilled water. The polymer thus obtained was re-precipitated in a mixed solution of methanol and hexane, and then dried at 120° C. to obtain a final copolycarbonate (Mw=31,500), which was designated as Si—PC.

Preparation Example 4

PC 1784 g of water, 385 g of NaOH and 232 g of bisphenol A (BPA) were added to a polymerization reactor, and dissolved with mixing under $N_2$ atmosphere. 4.7 g of para-tert butylphenol (PTBP) was dissolved in methylene chloride (MC) and added to the mixture. Subsequently, 128 g of TPG (triphosgene) was dissolved in MC and the dissolved TPG solution was added thereto and reacted for 1 hour while maintaining pH of the TPG solution at 11 or more. After 10 minutes, 46 g of TEA (triethylamine) was added thereto to carry out a coupling reaction. After a total reaction time of 1 hour and 20 minutes, pH was lowered to 4 to remove TEA, and then pH of the produced polymer was adjusted to neutral pH of 6 to 7 by washing three times with distilled water. The polymer thus obtained was re-precipitated in a mixed solution of methanol and hexane, and then dried at 120° C. to obtain a final polycarbonate (Mw=29,000), which was designated as PC.

Examples and Comparative Examples

Each polycarbonate resin composition was prepared by mixing the Si—PC prepared by Preparation Example 3, the PC prepared by Preparation Example 4, an impact reinforcing agent, a phosphorus-based flame retardant (BDP), talc and other additives (Irganox 1076 0.1 wt %, Irgafos 0.2 wt %) were mixed at a weight ratio as shown in Table 1 below.

TABLE 1

|  | Example 1 | Example 2 | Comparative Example 1 | Comparative Example 2 | Comparative Example 3 |
|---|---|---|---|---|---|
| PC | 53 wt % | 48 wt % | 73 wt % | — | 78 wt % |
| Impact Reinforcing Agent[1] | 5 wt % | 5 wt % | 5 wt % | 5 wt % | 5 wt % |
| BDP[2] | 12 wt % | 12 wt % | 12 wt % | 12 wt % | 12 wt % |
| Si-PC | 20 wt % | 20 wt % | — | 70 wt % | — |
| Talc | 5 wt % | 10 wt % | 5 wt % | 5 wt % | — |

[1]Impact Reinforcing Agent: a mixture (weight ratio = 3:2) of MBS (EM 500, LG Chem.) and SAN (AN-24%, ST-76%)
[2]BDP: Bisphenol-A bis(diphenyl phosphate)

Experimental Example

Each polycarbonate resin composition of Examples and Comparative Examples was pelletized using a φ30 mm twin-screw extruder provided with a vent, and injection-molded at a cylinder temperature of 300° C. and a mold temperature of 80° C. using an N-20C injection molding machine of JSW, LTD., to manufacture each specimen. Physical properties of the above specimens were measured as follows.

1) flexure strength (kg/cm$^2$): measured with specimen of ⅛" in accordance with ASTM 0638.

2) IZOD impact strength (kg·cm/cm): measured with specimen of ⅛" in accordance with ASTM D256.

3) flame retardancy: evaluated in accordance with UL 94V. Specifically, five specimens having a thickness of 1.0 mm required for a flame retardancy test were prepared, and evaluated as follows.

First, a flame having a height of 20 mm was in contact with each specimen for 10 seconds, and then a combustion time (t1) of the specimen was measured, and a combustion aspect was recorded. Then, after the primary flame-contact, the combustion was terminated, and a flame was in contact with each specimen for another 10 seconds (secondary flame-contact). Next, a combustion time (t2) and a glowing time (t3) of the specimen were measured, and a combustion aspect was recorded. The above-described flame retardancy test was equally applied to five specimens, and the specimens were evaluated as shown in Table 2 below.

TABLE 2

| Flame Retardancy Rating | V-0 | V-1 | V-2 |
|---|---|---|---|
| Each combustion time (t1 or t2 of each specimen) | Not more than 10 sec | Not more than 30 sec | Not more than 30 sec |
| Total combustion time of five specimens (sum of t1 and t2 of five specimens) | Not more than 50 sec | Not more than 250 sec | Not more than 250 sec |
| Combustion time and Glowing time after secondary flame-contact (sum of t2 and t3 of each specimen) | Not more than 30 sec | Not more than 60 sec | Not more than 60 sec |
| Whether particle causing flame is dropped. | None | None | None |

4) Whiteness (evaluation of appearance, yellow index (YI)): A disc specimen (1.5 mm) was injection-molded, and an L value was measured by using a color-difference meter, and appearance was further confirmed with the naked eye.

The results were shown in Table 3 below.

TABLE 3

|  | Example 1 | Example 2 | Comparative Example 1 | Comparative Example 2 | Comparative Example 3 |
|---|---|---|---|---|---|
| Flexure Strength | 31,000 | 33,000 | 32,000 | 29,000 | 25,000 |
| IZOD Impact Strength | 25 | 20 | 8 | 21 | 50 |
| Flame Retardancy | 1.0 mm, V-0 | 1.0 mm, V-0 | 1.0 mm, V-0 | 1.0 mm, V-0 | 1.0 mm, V-0 |
| Color (L*) | 3.9 | 4.0 | 3.8 | 3.9 | 3.5 |
| Appearance | ○ | Δ | Δ | Δ | X |

As shown in Table 3, it could be confirmed that examples showed remarkably higher flexure strength and IZOD impact strength than those of comparative examples, and also presented remarkably excellent appearance.

Therefore, it could be confirmed that when the inorganic filler and the copolycarbonate are simultaneously included in the PC resin as described in the present invention, the appearance defect may be suppressed while simultaneously improving the mechanical property.

The invention claimed is:

1. A polycarbonate composition comprising:

a polycarbonate, an impact reinforcing agent, a copolycarbonate comprising an aromatic polycarbonate-based first repeating unit;

and one or more aromatic polycarbonate-based second repeating units having siloxane bonds, and an inorganic filler, wherein the first repeating unit is represented by Chemical Formula 1 below, and the second repeating unit comprises a repeating unit represented by Chemical Formula 2 below and a repeating unit represented by Chemical Formula 3 below:

[Chemical Formula 1]

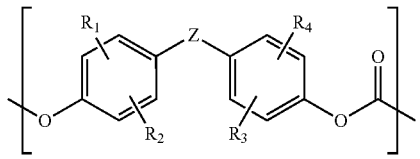

in the Chemical Formula 1, $R_1$, $R_2$, $R_3$ and $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Chemical Formula 2]

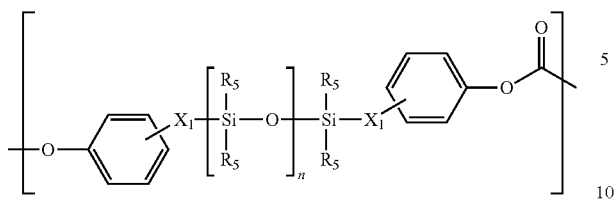

in the Chemical Formula 2, $X_1$ is each independently $C_{1-10}$ alkylene, $R_5$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 10 to 200,

[Chemical Formula 3]

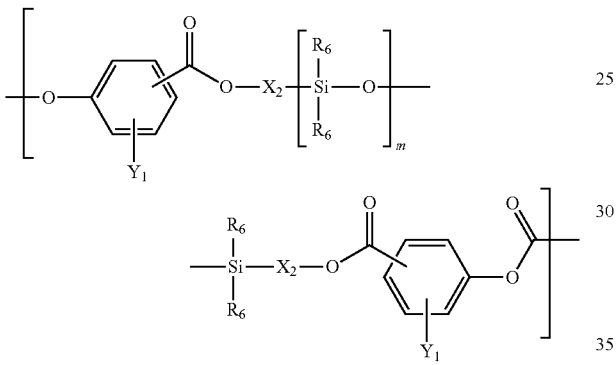

in the Chemical Formula 3, $X_2$ is each independently $C_{1-10}$ alkylene, $Y_1$ is each independently hydrogen, $C_{1-6}$ alkyl, halogen, hydroxy, $C_{1-6}$ alkoxy, or $C_{6-20}$ aryl, $R_6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 10 to 200.

2. The polycarbonate composition of claim 1, wherein:
the polycarbonate composition comprises 1 to 13 parts by weight of the polycarbonate,
1 part by weight of the impact reinforcing agent,
1 to 6 parts by weight of the copolycarbonate, and
0.5 to 4 parts by weight of the inorganic filler.

3. The polycarbonate composition of claim 1, wherein:
the polycarbonate comprises a repeating unit represented by Chemical Formula 4 below:

[Chemical Formula 4]

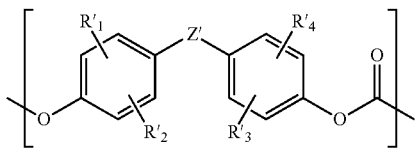

in the Chemical Formula 4, $R'_1$, $R'_2$, $R'_3$ and $R'_4$ are each independently hydrogen, $C_{1-10}$ alkyl, $C_{1-10}$ alkoxy, or halogen, and $Z'$ is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

4. The polycarbonate composition of claim 1, wherein:
the impact reinforcing agent is a methylmethacrylate-butadiene-styrene-based copolymer, a styrene-acrylonitrile-based copolymer, an acrylonitrile-butadiene-styrene-based copolymer, or mixtures thereof.

5. The polycarbonate composition of claim 1, wherein:
the polycarbonate composition comprises 5 to 13 parts by weight of the polycarbonate.

6. The polycarbonate composition of claim 1, wherein:
the polycarbonate has a weight average molecular weight of 1,000 to 100,000.

7. The polycarbonate composition of claim 1, wherein:
the copolycarbonate has a weight average molecular weight of 1,000 to 100,000.

8. The polycarbonate composition of claim 1, further comprising:
0.5 to 4 parts by weight of a flame retardant.

9. The polycarbonate composition of claim 8, wherein:
the flame retardant is a phosphorus-based flame retardant.

10. The polycarbonate composition of claim 9, wherein:
the phosphorus-based flame retardant is bisphenol-A bis (diphenyl phosphate).

11. The polycarbonate composition of claim 1, wherein:
the inorganic filler is talc, wollastonite, mica, or mixtures thereof.

12. An article manufactured by the polycarbonate composition of claim 1.

* * * * *